(12) United States Patent
Tong et al.

(10) Patent No.: US 8,456,181 B2
(45) Date of Patent: Jun. 4, 2013

(54) MEASUREMENT CIRCUIT FOR POWER SUPPLY

(75) Inventors: Song-Lin Tong, Shenzhen (CN); Qi-Yan Luo, Shenzhen (CN); Peng Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 368 days.

(21) Appl. No.: 12/981,528

(22) Filed: Dec. 30, 2010

(65) Prior Publication Data
US 2012/0161798 A1 Jun. 28, 2012

(51) Int. Cl.
*G01R 27/08* (2006.01)
(52) U.S. Cl.
USPC .......................................... 324/705; 324/713
(58) Field of Classification Search
USPC ................................................. 324/706, 713
See application file for complete search history.

(56) References Cited

U.S. PATENT DOCUMENTS
2011/0084679 A1* 4/2011 Balakrishnan et al. ....... 323/285

* cited by examiner

*Primary Examiner* — Vincent Q Nguyen
(74) *Attorney, Agent, or Firm* — Altis Law Group, Inc.

(57) ABSTRACT

A measurement circuit includes a switch unit with a number of keys selectively pressed to output different resistance regulating signals. A resistance setting circuit receives the resistance regulating signals and connects different resistances to a control circuit. The control circuit obtains a voltage according to the chosen resistance by the resistance setting circuit and compares the voltage with a preset voltage. If the voltage is greater than the preset voltage, the control circuit outputs a high level signal to a control pin of a pulse width modulation (PWM) controller, to control a voltage unit to output a voltage. If the voltage is less than the preset voltage, the control circuit outputs a low level signal to the control pin of the PWM controller, to control the voltage unit to not output a voltage. A display unit displays the chosen resistance.

10 Claims, 3 Drawing Sheets

MEASUREMENT CIRCUIT FOR POWER SUPPLY

BACKGROUND

1. Field of the Invention

The present disclosure relates to measurement circuits, and particularly to a measurement circuit providing over-temperature protection to a power supply.

2. Description of Related Art

Over-temperature protection in a power supply is provided by connecting different resistors to the power supply manually, to generate optimal resistance for over-temperature protection. However, the resistors must be individually soldered to corresponding locations, which is inconvenient and time-consuming.

BRIEF DESCRIPTION OF THE DRAWINGS

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the several views.

DETAILED DESCRIPTION

The disclosure, including the drawings, is illustrated by way of example and not by limitation. It should be noted that references to "an" or "one" embodiment in this disclosure are not necessarily to the same embodiment, and such references mean at least one.

Figure 1:
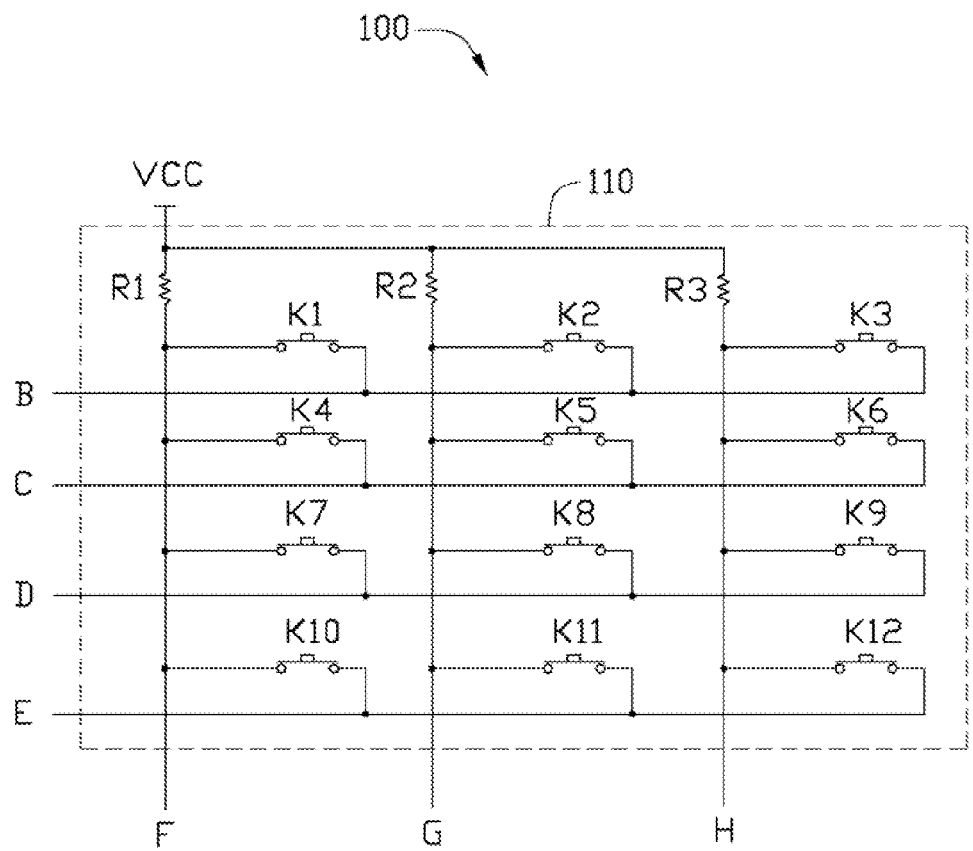
FIG. 1 to FIG. 3 are circuit diagrams of a measurement circuit providing over-temperature protection for a power supply in accordance with an exemplary embodiment of the present disclosure.
Figure 2:
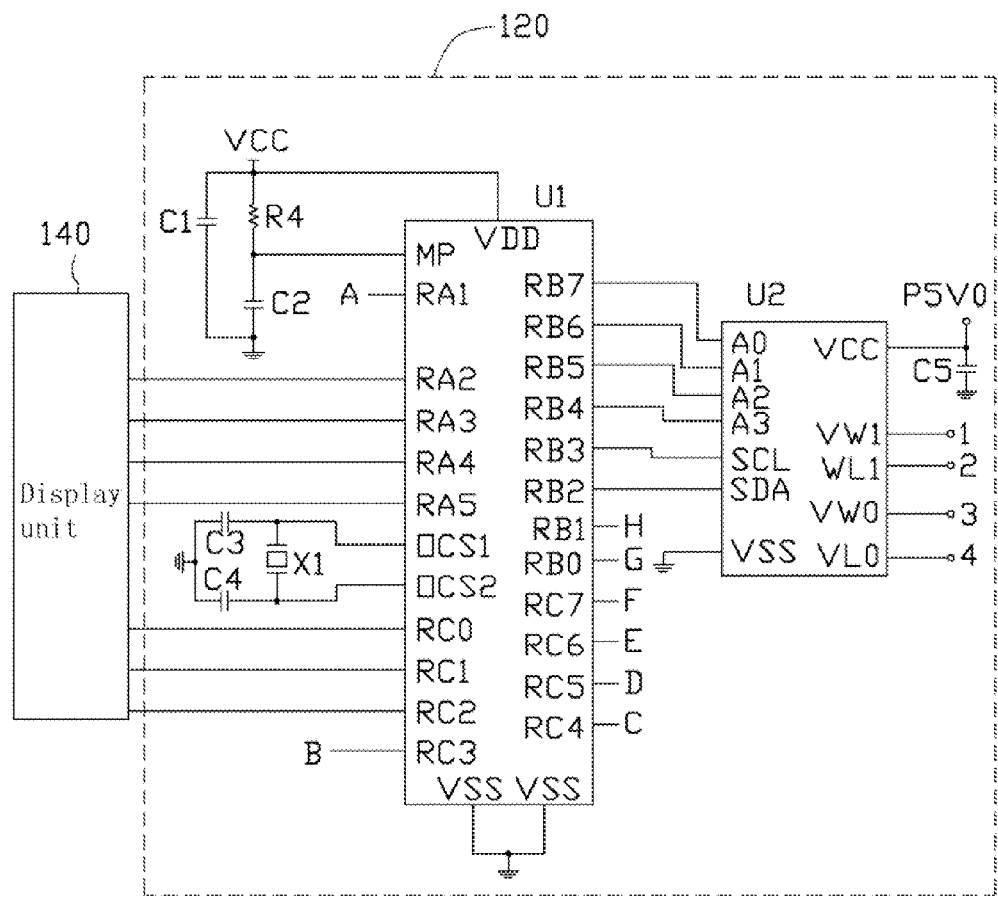
Figure 3:
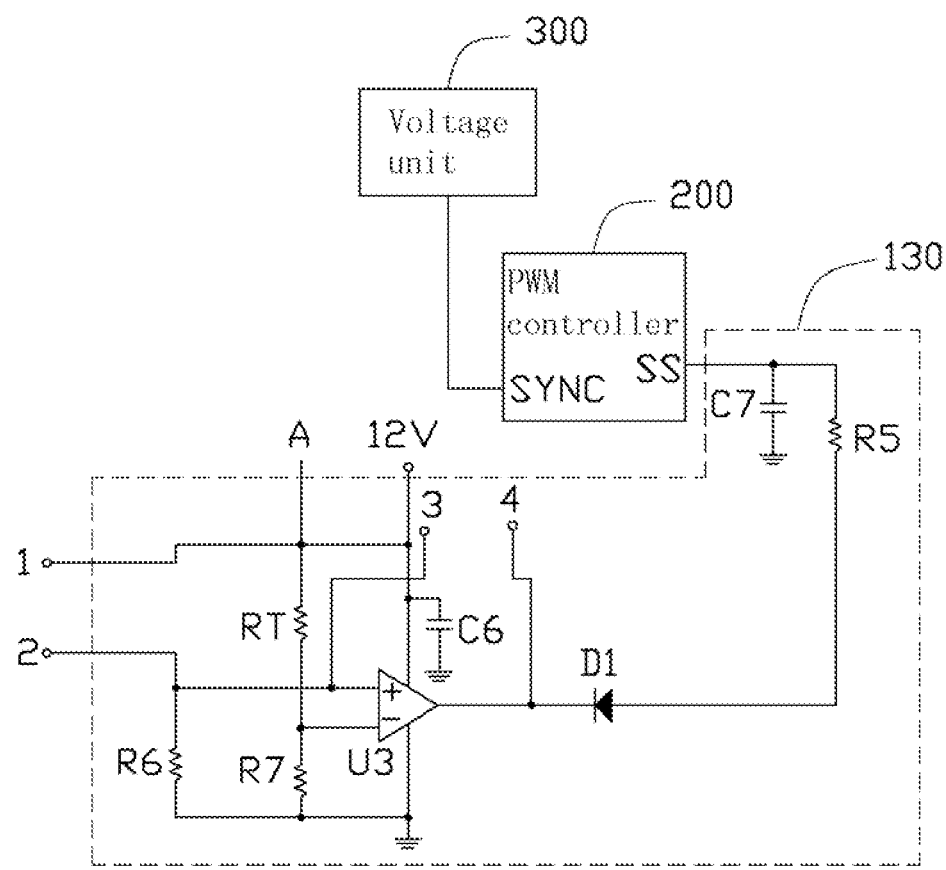

Referring to FIG. 1 to FIG. 3, a measurement circuit 100 is configured to provide over-temperature protection for a power supply (not shown). The measurement circuit 100 in accordance with an exemplary embodiment includes a switch unit 110, a resistance setting circuit 120, a control circuit 130, and a display unit 140. The switch unit 110 is configured to output resistance regulating signals to the resistance setting circuit 120. The resistance setting circuit 120 is configured to connect different resistances to the control circuit 130 according to the received resistance regulating signals. The control circuit 130 is configured to output control signals to a pulse width modulation (PWM) controller 200 according to the different resistances, to make the PWM controller 200 control work states of a voltage unit 300 of the power supply. The resistance setting circuit 120 controls the display unit 140 to display the resistances.

The resistance setting circuit 120 includes a microcontroller U1, a digital regulation resistance U2, a resistor R4, capacitors C1-C5, and a crystal oscillator X1. A voltage pin VDD of the microcontroller U1 is connected to a power source VCC and also grounded through the resistor R4 and the capacitor C2 connected in series. A voltage pin MP of the microcontroller U1 is connected to a node between the resistor R4 and the capacitor C2. The capacitor C1 is connected between the power source VCC and ground. A clock pin OCS1 of the microcontroller U1 is grounded through the capacitor C3. A clock pin OCS2 of the microcontroller U1 is grounded through the capacitor C4. The crystal oscillator X1 is connected between the clock pins OCS1 and OCS2 of the microcontroller U1. Output pins RB7-RB4 of the microcontroller U1 are respectively connected to input pins A0-A3 of the digital regulation resistance U2. An output pin RB3 of the microcontroller U1 is connected to a clock pin SCL of the digital regulation resistance U2. An output pin RB2 of the microcontroller U1 is connected to a data pin SDA of the digital regulation resistance U2. A voltage pin VCC of the digital regulation resistance U2 is connected to a power source P5V0 and also grounded through the capacitor C5. Output pins VW1, VL1, VW0, VL0 of the digital regulation resistance U2 are connected to the control circuit 130. Output pins RA2-RA5 and RC0-RC2 of the microcontroller U1 are connected to the display unit 140. In one embodiment, the microcontroller U1 is a PIC16F73 microcontroller, and the digital regulation resistance U2 is an X9241 digital regulation resistance.

The control circuit 130 includes a comparator U3, a diode D1, a thermal resistor RT, resistors R5-R7, and capacitors C6 and C7. A non-inverting input terminal of the comparator U3 is connected to the output pins VL1 and VW0 of the digital regulation resistance U2. The resistor R6 is connected between the non-inverting input terminal of the comparator U3 and ground. An inverting input terminal of the comparator U3 is connected to all of a detecting pin RA1 of the microcontroller U1, the output pin VW1 of the digital regulation resistance U2, and a power source +12V through the thermal resistor RT. The resistor R7 is connected between the inverting input terminal of the comparator U3 and ground. A voltage terminal of the comparator U3 is grounded through the capacitor C6 and also connected to the power source +12V. An output terminal of the comparator U3 is connected to the output pin VL0 of the digital regulation resistance U2 and also connected to a cathode of the diode D1. An anode of the diode D1 is connected to a control pin SS of the PWM controller 200 through the resistor R5. The capacitor C7 is connected between the control pin SS of the PWM controller 200 and ground. An output pin SYNC of the PWM controller 200 is connected to the voltage unit 300, to control work states of the voltage unit 300. In one embodiment, the thermal resistor RT is a negative coefficient thermal resistor.

The switch unit 110 includes a plurality of keys, such as keys K1-K12, and resistors R1-R3. The keys K1-K12 are arranged in a 4*3 matrix. The keys K1-K8 are configured to output resistance regulating signals to the microcontroller U1. The keys K10-K12 are configured to be used to setting functions, such as "enter", "delete", and "start". The key K9 is inactive. The resistance setting circuit 120 receives the resistance regulating signals when the key K10 is pressed. The key K11 can be pressed to cancel operation after the keys K1-K8 are pressed. The switch unit 110 can be started when the key K12 is pressed.

The resistors R1-R3 are respectively connected between input pins RC7, RB0, and RB1 of the microcontroller U1 and the power source. First terminals of the keys K1-K3 are connected to an input pin RC3 of the microcontroller U1. Second terminals of the key K1-K3 are respectively connected to the input pins RC7, RB0, and RB1 of the microcontroller U1. First terminals of the keys K4-K6 are connected to an input pin RC4 of the microcontroller U1. Second terminals of the key K4-K6 are respectively connected to the input pins RC7, RB0, and RB1 of the microcontroller U1. First terminals of the keys K7-K9 are connected to an input pin RC5 of the microcontroller U1. Second terminals of the key K7-K9 are respectively connected to the input pins RC7, RB0, RB1 of the microcontroller U1. First terminals of the keys K10-K12 are connected to an input pin RC6 of the microcontroller U1. Second terminals of the keys K10-K12 are respectively connected to the input terminals RC7, RB0, RB1 of the microcontroller U1.

In use, the switch unit 110 is started when the key K12 is pressed, and then the keys K1-K8 are selectively pressed, to provide an eight-bit binary signal to the microcontroller U1. For example, if the over-temperature is set with 80 degrees, "11110000" is input to the microcontroller U1 when the keys K1-K4 are pressed and the keys K5-K8 are not pressed. The microcontroller U1 receives the signal "11110000" through pressing the key K10. The microcontroller U1 controls the digital regulation resistance U2 to connect a resistance between the non-inverting input terminal of the comparator U3 and the power source +12V. If a voltage of the non-inverting input terminal of the comparator U3 is greater than a voltage of the inverting input terminal of the comparator U3, the comparator U3 outputs a high level signal through the diode D1 to the control pin SS of the PWM controller 200, to control the voltage unit 300 to output a voltage. The microcontroller U1 controls the display unit 140 to display the resistance. At the same time, the microcontroller U1 detects the resistance of the thermal resistor RT, compares the resistance with a preset resistance, and then obtains a temperature. The microcontroller U1 controls the display unit 140 to display the temperature. Resistance of the thermal resistor RT is reduced when temperature is increased, if a voltage of the non-inverting input terminal of the comparator U3 is less than a voltage of the inverting input terminal of the comparator U3, the comparator U3 outputs a low level signal through the diode D1 to the control pin SS of the PWM controller 200, to control the voltage unit 300 to not output a voltage. Namely, the power supply is powered off. The microcontroller U1 controls the display unit 140 to display the resistance, which is an optimal resistance of the over-temperature protection. At the same time, the microcontroller U1 detects the resistance of the thermal resistor RT, compares the resistance with a preset resistance, and then obtains a temperature. The microcontroller U1 controls the display unit 140 to display the temperature, which is an optimal temperature corresponding to the optimal resistance of the over-temperature protection. When temperature of the over-temperature protection needs to be changed, the resistance regulating signals are changed by selectively pressing the keys K1-K8, to make the microcontroller U1 controls the digital regulation resistance U2 to connect other resistances between the non-inverting input terminal of the comparator U3 and the power source +12V, the theory is same as above.

When the power supply is powered off, the keys K1-K8 are selectively pressed, to provide an eight-bit binary signal to the microcontroller U1. For example, a recovery temperature at which the voltage unit 300 recoveries to work is set with 20 degrees, "00001111" is input to the microcontroller U1 when the keys K5-K8 are pressed and the keys K1-K4 are not pressed. The microcontroller U1 receives the signal "00001111" through pressing the key K10. The microcontroller U1 controls the digital regulation resistance U2 to connect a resistance between the non-inverting input terminal and the output terminal of the comparator U3. If a voltage of the non-inverting input terminal of the comparator U3 is greater than a voltage of the inverting input terminal of the comparator U3, the comparator U3 outputs a high level signal through the diode D1 to the control pin SS of the PWM controller 200, to control the voltage unit 300 to output a voltage. Namely, the power supply returns to work. The microcontroller U1 controls the display unit 140 to display the resistance, which is an optimal resistance. At the same time, the microcontroller U1 detects the resistance of the thermal resistor RT, compares the resistance with a preset resistance, and then obtains a temperature. The microcontroller U1 controls the display unit 140 to display the temperature, which is an optimal temperature corresponding to the optimal resistance. When temperature of the recovery temperature needs to be changed, the resistance regulating signals are changed by selectively pressing the keys K1-K8, to make the microcontroller U1 controls the digital regulation resistance U2 to connect other resistances between the non-inverting input terminal and the output terminal of the comparator U3, the theory is same as above.

The measurement circuit 100 can automatically connect different resistances to the over-temperature protection circuit, to obtain an optimal resistance of the over-temperature, and the measurement circuit 100 can also connect different resistances to the over-temperature protection circuit, to obtain an optimal resistance of the recovery temperature after the power supply is powered off, to control the power supply to return to work. The measurement circuit 100 is simple and time-saving.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A measurement circuit for a power supply, the measurement circuit comprising:
    a switch unit comprising a plurality of keys, wherein the plurality of keys are selectively pressed to output different resistance regulating signals;
    a control circuit;
    a resistance setting circuit to receive the resistance regulating signals from the switch unit and connect different resistances to the control circuit according to received resistance regulating signals; wherein the control circuit obtains a voltage according to the chosen resistance by the resistance setting circuit and compares the voltage with a preset voltage, upon a condition that the voltage is greater than the preset voltage, the control circuit outputs a high level signal to a control pin of a pulse width modulation (PWM) controller, to control a voltage unit to output a voltage, upon a condition that the voltage is less than the preset voltage, the control circuit outputs a low level signal to the control pin of the PWM controller, to control the voltage unit to not output a voltage; and
    a display unit to display the chosen resistance.

2. The measurement circuit as claimed in claim 1, wherein the resistance setting circuit comprises a microcontroller, a digital regulation resistance, a first resistor, first to fifth capacitors, and a crystal oscillator, a first voltage pin of the microcontroller is connected to a first power source and also grounded through the first resistor and the second capacitor connected in series, a second voltage pin of the microcontroller is connected between the first resistor and the second capacitor, the first capacitor is connected between the first power source and ground, a first clock pin of the microcontroller is grounded through the third capacitor, a second clock pin of the microcontroller is grounded through the fourth capacitor, the crystal oscillator is connected between the first and the second clock pins of the microcontroller, first to fourth output pins of the microcontroller are respectively connected to first to fourth input pins of the digital regulation resistance, a fifth output pin of the microcontroller is connected to a clock pin of the digital regulation resistance, a sixth output pin of the microcontroller is connected to a data pin of the digital regulation resistance, a voltage pin of the digital regulation resistance is connected to a second power source and also grounded through the fifth capacitor, first to fourth output pins of the digital regulation resistance are connected to the control circuit.

3. The measurement circuit as claimed in claim 2, wherein the second power source is a 5 volt (V) power source.

4. The measurement circuit as claimed in claim 2, wherein the switch circuit comprises a comparator, a diode, a thermal resistor, second to fourth resistors, and sixth and seventh capacitors, a non-inverting input terminal of the comparator is connected to first and second output terminals of the digital regulation resistance, the third resistor is connected between the non-inverting input terminal of the comparator and ground, an inverting input terminal of the comparator is connected to all of a detecting pin of the microcontroller, a third output terminal of the digital regulation resistance, and a third power source through the thermal resistor, the fourth resistor is connected between the inverting input terminal of the comparator and ground, a voltage terminal of the comparator is grounded through the sixth capacitor and also connected to the third power source, an output terminal of the comparator is connected to a fourth output terminal of the digital regulation resistance and also connected to a cathode of the diode, an anode of the diode is connected to the control pin of the PWM controller through the second resistor, the seventh capacitor is connected between the control pin of the PWM controller and ground.

5. The measurement circuit as claimed in claim 4, wherein the third power source is a 12V power source.

6. The measurement circuit as claimed in claim 4, wherein the thermal resistor is a negative coefficient thermal resistor.

7. The measurement circuit as claimed in claim 4, wherein the display unit is connected to seventh to thirteenth output pins of the microcontroller.

8. The measurement circuit as claimed in claim 4, wherein the switch unit comprises first to eight keys, first terminals of the first to the third keys are connected to a first input pin of the microcontroller, second terminals of the first to the third keys are respectively connected to fifth to seventh input pins of the microcontroller, first terminals of the fourth to the sixth keys are connected to a second input pin of the microcontroller, second terminals of the fourth to the sixth keys are respectively connected to the fifth to the seventh input pins of the microcontroller, first terminals of the seventh and the eighth keys are connected to a third input pin of the microcontroller, second terminals of the seventh and the eighth keys are respectively connected to the fifth and the sixth input pins of the microcontroller.

9. The measurement circuit as claimed in claim 8, wherein the switch unit further comprises ninth to twelve keys, the ninth key is inactive, the tenth to the twelve keys are configured to be used to setting functions "enter", "delete", and "start", the resistance setting circuit receives the resistance regulating signals when the tenth key is pressed, the eleventh key is pressed to cancel operations after the first to eight keys are pressed, the switch unit is started when the twelve key is pressed, a first terminal of the ninth key is connected to the third input pin of the microcontroller, a second terminal of the ninth key is connected to the seventh input pin of the microcontroller, first terminals of the tenth to the twelve keys are connected to a fourth input pin of the microcontroller, second terminals of the tenth to the twelve keys are respectively connected to the fifth to the seventh input pins of the microcontroller.

10. The measurement circuit as claimed in claim 9, wherein the switch unit further comprises fifth to seventh resistors, the fifth resistor is connected between the first power source and the second terminals of the first key, the fourth key, the seventh key, and the tenth key, wherein the sixth resistor is connected between the first power source and the second terminals of the second key, the fifth key, the eighth key, and the eleventh key, wherein the seventh resistor is connected between the first power source and the second terminals of the third key, the sixth key, the ninth key, and the twelfth key.

* * * * *